Figure 1:
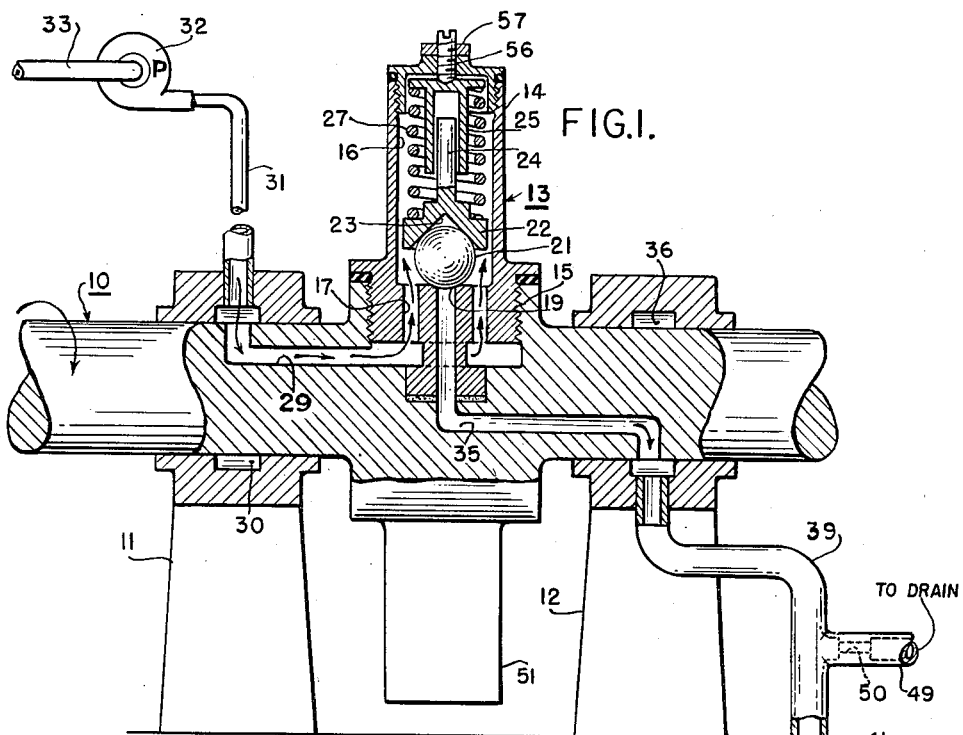

May 31, 1960

R. A. NEAL 2,938,502

CENTRIFUGAL CONTROL MECHANISM

Filed Nov. 20, 1958

TO DRAIN

INVENTOR
ROBERT A. NEAL

BY *Frank Cristiano Jr.*

United States Patent Office 2,938,502
Patented May 31, 1960

2,938,502

CENTRIFUGAL CONTROL MECHANISM

Robert A. Neal, Shawnee, Kans., assignor to Westinghouse Electric Corporation, East Pittsburgh, Pa., a corporation of Pennsylvania Filed Nov. 20, 1958, Ser. No. 775,178

6 Claims. (Cl. 121—43)

This invention relates to speed responsive control mechanisms, more particularly to a control mechanism for providing a signal at a preselected speed of a rotatable shaft, and has for an object to provide an improved device of this character.

It is a further object of this invention to provide a centrifugal control mechanism for controlling a pressure responsive mechanism in which a fluid pressure signal is initiated at a first preselected speed and terminated at a second and lower preselected speed, thereby to obviate cycling or hunting of the control mechanism and the pressure responsive mechanism.

It is another object to provide a hydraulic control mechanism of the above type in which a centrifugally influenced valve member is moved in radially outwardly direction at a first preselected speed and moved in radially inwardly direction at a second and lower preselected speed.

Yet another object is to provide a centrifugal hydraulic control mechanism of the above type which is simple and inexpensive to manufacture, yet highly reliable and effective in operation.

In accordance with the invention, the centrifugal control mechanism is disposed on a rotatable shaft and comprises a housing structure defining a radially outwardly extending chamber having a continuously open inlet for admitting hydraulic fluid thereto and an outlet port for delivering the fluid therefrom. The outlet port is disposed in the radially inward portion of the housing structure and faces outwardly and a valve member of preferably ball or spherical shape is disposed in the chamber and operatively associated with the outlet port. The valve member is biased by a spring member in radially inward direction into blocking relation with the port, but is movable by centrifugal force in radially outward direction to unblock said outlet port at a preselected speed. Pressurized hydraulic fluid from a suitable supply is admitted to said chamber through the inlet, and the outlet port is connected to a fluid actuated servo-motor or other suitable pressure responsive mechanism by a conduit.

During rotational operation of the shaft at speeds below the preselected speed setting of the centrifugal control mechanism, the centrifugal force on the ball valve is opposed by the differential fluid pressure across the ball and the preponderant force of the biasing spring, and the ball valve is maintained in the seated position against the outlet port. Hence no fluid pressure signal is provided to the pressure responsive mechanism.

As the speed of the shaft attains the value corresponding to the preselected speed setting of the control mechanism, the centrifugal forces induced in the ball valve are increased to a value exceeding the pressure differential and spring bias forces, causing the ball valve to move radially outwardly with an accelerating or snap-acting movement, thereby unblocking the outlet port. The pressurized hydraulic fluid is thus transmitted at substantially full pressure through the conduit to provide an actuating signal for the pressure responsive mechanism.

When the ball is moved to the port unblocking position, the differential fluid pressure across the ball is destroyed. Accordingly, the effective restoring force is diminished and is provided solely by the spring bias. In addition, the centrifugal force on the ball valve is increased, since the ball valve is now positioned further from the axis of rotation. Hence the ball valve will remain in the unblocking position until the speed of the shaft is reduced to a value lower than that required to unseat the valve. As the shaft attains this diminished speed value, the ball valve is moved with an accelerating action into the port blocking position to terminate the pressure signal and permit the pressure responsive mechanism to return to its original position. With this arrangement cycling or "hunting" of the valve is obviated and positive port opening and closing action is assured.

The pressure responsive mechanism may be employed in any suitable manner to control apparatus dependent on or associated with the rotatable shaft, to institute corrective action or other function, as well known in the art.

Figure 2:
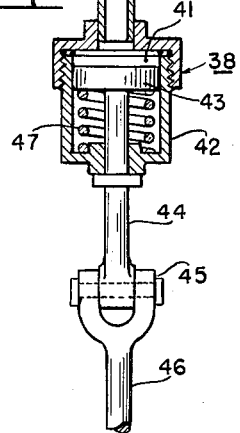
Figure 2:
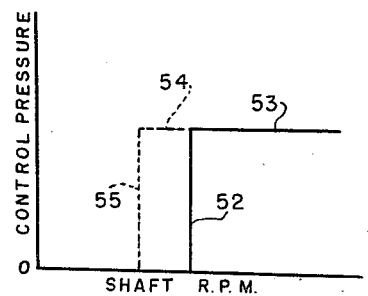

The foregoing and other objects are effected by the invention as will be apparent from the following description and claims taken in connection with the accompanying drawings, forming a part of this application, in which:

Fig. 1 is a schematic view illustrating a rotatable shaft having provided therein a centrifugal hydraulic speed control mechanism formed in accordance with the invention; and Fig. 2 is a chart showing the mode of operation of the hydraulic control mechanism illustrated in Fig. 1.

Referring to the drawing in detail, in Fig. 1 there is shown a rotatable shaft 10 which may form a part of, or may be connected to, any suitable rotating apparatus such as a turbine or internal combustion engine (not shown). The shaft 10 is supported for rotation upon suitable pedestals 11 and 12 and a centrifugal hydraulic speed control mechanism, generally indicated 13, is mounted thereon for joint rotation therewith. The control mechanism 13 includes a tubular housing structure 14 extending radially outwardly from the shaft and attached thereto in any suitable manner, for example, by a fluid-tight threaded connection 15. The housing 14 is hollow and defines a circular chamber 16 which extends transversely to the longitudinal axis of the rotatable shaft and is filled with pressurized hydraulic fluid admitted thereto through a continuously open inlet 17 of any suitable shape, for example, annular as illustrated. The housing 14 is further provided with a centrally located outlet port 19 disposed at the radially inward end thereof and facing radially outwardly.

Within the housing 14 there is provided a movable valve member 21 of generally ball or spherical shape, disposed in cooperative association with the outlet port 19. The ball valve 21 is of smaller diameter than the diameter of the chamber 16, so that it is substantially immersed in, and surrounded by the liquid contained therein, except for a small portion thereof encompassed by the outlet port. The ball valve 21 is maintained in coaxial alignment with the axis of the port 19 by a guide member 22 having a centrally formed conical recess 23 and an elongated shaft portion 24 extending upwardly therefrom. The guide member 22 has its shaft 24 slidably received within a thimble 25 and is thereby maintained in a position coaxial with the chamber 16 and the port 19, but permitted to move freely in radially inwardly and outwardly direction. Between the guide member 22 and the upper end portion of the thimble 25, there is provided a helical compression spring member 27 which is effective to bias the guide member and the ball valve 21 in radially inwardly direction, thereby to maintain the ball valve in port blocking position against the outlet port 19, as shown in the drawing.

The inlet 17 is disposed in communication with a longitudinal passageway 29 formed in the rotatable shaft 10, which passageway in turn communicates with an annular recess 30 formed in the pedestal 11. The recess 30 provides a continuous communication with a liquid supply conduit 31 having one end received in the pedestal 11 and its other end disposed in communication with a hydraulic fluid or liquid supply pump 32. The pump 32, as illustrated, is of the centrifugal type and is provided with liquid by a conduit 33 connected to a suitable source (not shown). The pump may be energized in any desirable manner to provide liquid to the control mechanism 13 at a suitable pressure and flow rate.

In a similar manner, the outlet port 19 is connected to a passageway 35 formed in the rotatable shaft which, in turn, communicates with an annular recess 36 formed in the pedestal 12. A suitable pressure responsive mechanism 38 is connected by a conduit 39 to the annular recess 36.

The mechanism 38, as illustrated, may be of the type generally termed a servo-motor in which a bore or piston chamber 41 is provided by a tubular housing 42 and having received therein a reciprocable piston member 43. The piston member 43 has a shaft 44 extending downwardly through the housing 42 and connected by a clevis 45 to a suitable actuating link or arm 46. The link 46 may be connected to any suitable mechanism (not shown). Such mechanism, as well known in the art, may be of the type utilized to institute corrective action on the speed of the rotatable shaft 10 or to provide other useful functions in conjunction with the machine to which the shaft 10 is connected. The piston member 43 is biased in upward direction to its upper limit of travel by a compression spring 47 and is movable downwardly to its lower limit of travel in response to a liquid pressure signal delivered to the chamber 41 by the speed control mechanism 13, in a manner subsequently to be described. The conduit 39 may be connected to a drain by a suitable conduit 49 having a small orifice 50 formed therein to minimize flow of the liquid therethrough during operation.

To counterbalance the eccentric mass of the control mechanism 13 during rotation, a counterweight 51 is provided on the shaft 10 in a position diametrically opposite to that of the mechanism.

In operation, when the shaft 10 is operating below a selected speed, the speed control mechanism 13 is effective to maintain the ball 21 in the port blocking position as shown. The forces acting on the ball valve 21 to maintain the same in the seated position are the biasing effect of the spring member 27 and the differential fluid pressure value acting on the ball valve in radially inwardly direction. The differential pressure is attained in the port blocking position, since a small surface portion of the ball is covered by the port 19 and is not subjected to the fluid pressure of the liquid within the chamber 16. However, as the selected speed is obtained, the centrifugal forces acting on the ball valve 21 become sufficiently large to overcome the biasing force and the differential liquid pressure force and cause the ball valve to move radially outwardly. As the ball valve moves radially outwardly, the differential pressure force is lost, since the ball becomes totally surrounded by the liquid in the chamber. Hence, the net radially outward force increases, thereby causing the ball valve to accelerate in its outward movement. A further factor tending to cause this acceleration is the increase in radial distance of the ball valve from the longitudinal axis of the rotatable shaft. Accordingly, the ball valve moves to the port unblocking position with a sudden or snap action.

As the ball valve moves to the port unblocking position, the liquid in the chamber 16 is directed through the outlet port 19, passageway 35 and conduit 39 to the chamber 41 of the pressure responsive mechanism 38, thereby to provide an actuating pressure signal therefor at full pressure value and cause the piston 43 and its associated link 46 to move downwardly to the lower limit of their travel. During the above operation, the pump 32 is effective to provide the additional fluid required to the system by way of conduit 31, passageway 29 and inlet 17. Hencce, although some of the liquid in conduit 39 will flow through the orifice 50 in the conduit 49 to the drain, such loss is small and has no effect on operation of the pressure responsive mechanism 38.

Should the speed of the rotatable shaft fall to a value only slightly lower than the set speed of the control 13, the ball valve 21 will remain in the port opening position, since the forces tending to hold the ball valve in the radially outer or open position are larger than the forces tending to restore the ball to the seated position. However, should the speed of the shaft fall to a sufficiently low value to cause a sufficient reduction in the centrifugal forces tending to hold the ball valve in the radially outer position, the bias force of the spring member 27 will eventually predominate and urge the ball to the seated position. As the ball valve moves radially inwardly, the radial distance of the ball from the longitudinal axis of the shaft is reduced, thus further reducing the centrifugal forces acting thereon and causing the ball valve to move into the port blocking position with an accelerated or "snap" effect.

As fluid flow to the pressure responsive mechanism 38 is interrupted, the fluid pressure in its chamber 41 is quickly relieved by the flow through orifice 50, thereby permitting the piston 43 and its associated link 46 to move to their upper limit of travel.

The above scheme of operation is graphically shown in the chart of Fig. 2, wherein the solid vertical line 52 indicates the shaft speed in r.p.m. at which the ball valve 21 is unseated, thereby causing the control pressure signal illustrated by the solid horizontal line 53 to be delivered to the pressure responsive mechanism 38. It will be noted that as the shaft r.p.m. is increased above that indicated by line 52, the control pressure signal is maintained at a constant value, so that the link 46 is maintained in the fully lower position. It will be further seen, by referring to dotted horizontal line 54, that the pressure signal is maintained at the same value until a sufficient reduction in r.p.m. of the shaft is attained, as illustrated by dotted vertical line 55. Since the vertical lines 52 and 55 are spaced from each other along the abscissa, hunting or cycling of the speed control mechanism 13 is obviated in the critical speed range indicated by lines 52 and 55, since the action of the ball valve is positive in both port blocking and unblocking directions. The speed range defined by lines 52 and 55 may be determined by proper selection of outlet port area and radially outward travel of the ball valve.

The speed control mechanism 13 may be regulated to operate at any desired set speed by adjusting the bias of the spring member 27. In the example shown, this adjustment is attained by provision of a set screw 56 extending through the upper end wall of the housing 14 into abutment with the end portion of the thimble 25. To increase the speed setting, the screw 56 is screwed downwardly thereby to move the thimble downwardly and increase the compression of the spring 27. Conversely, to lower the speed setting, the set screw 56 is screwed upwardly to cause the thimble 25 to move upwardly with a following action and decrease the compression of the spring. The above settings may be provided in an infinite number of small increments due to the vernier effect of the screw 56 and the selected setting may be fixed by means of a lock nut 57 to prevent accidental movement of the screw member 56.

It will now be seen that the invention provides simple yet high effective hydraulic speed control mechanism of the centrifugal type for controlling a pressure actuated mechanism in a positive yet reliable manner.

It will further be seen that the invention provides a centrifugal speed control mechanism which is easily set to provide a fluid pressure signal at any selected speed within the range of the mechanism.

While the invention has been shown in but one form, it will be obvious to those skilled in the art that it is not so limited, but is susceptible of various changes and modifications without departing from the spirit thereof.

What is claimed is:

1. A centrifugal control mechanism comprising rotatable housing structure defining a chamber, means for admitting a pressurized fluid to said chamber, a radially outwardly facing outlet port formed in said housing and communicating with said chamber, a movable valve member disposed in said chamber in cooperative relation with said outlet port, and spring means for biasing said valve member in radially inwardly direction into blocking relation with said outlet port, said valve member being urged in radially inward direction when in the outlet port blocking position by the fluid pressure in said chamber.

2. A centrifugal control mechanism comprising rotatable housing structure defining a tubular radially extending chamber, means including a continuously open inlet for admitting a pressurized fluid to said chamber, said housing structure having a radially inward end portion providing an outlet port communicating with the radially inward portion of said chamber, said outlet port facing radially outwardly, a movable valve member immersed in the fluid in said chamber in cooperative relation with said outlet port, said valve member being movable in radially outward direction in response to centrifugal force to unblock said outlet port, and spring means for biasing said valve member in radially inwardly direction into blocking relation with said outlet port, the bias on said valve member in radially inward direction being augmented when said valve member is in the outlet port blocking position by the fluid pressure in said chamber.

3. A centrifugal control mechanism comprising rotatable housing structure defining a chamber extending transversely to the axis of rotation of said structure, means for admitting pressurized fluid to said chamber, means defining a radially outwardly facing outlet port communicating with said chamber, a movable valve member of smaller cross-sectional area than said chamber disposed therein in cooperative association with said outlet port, and spring means for biasing said valve member in radially inwardly direction into blocking relation with said outlet port, said valve member being additionally urged in radially inward direction when in the outlet port blocking position by the fluid pressure in said chamber.

4. A centrifugal control mechanism comprising rotatable housing structure defining a chamber extending radially outwardly of the axis of rotation of said structure, said housing having an inlet for admitting pressurized fluid to said chamber, said housing having a radially inward end portion, a radially outwardly facing outlet port formed in said end portion and communicating with said chamber, a movable valve member of smaller cross-sectional area than said chamber disposed therein in cooperative association with said outlet port and movable radially outwardly in response to centrifugal force to unblock said outlet port, and a spring member biasing said valve member in radially inwardly direction into blocking relation with said outlet port, the bias on said valve member in radially inward direction being augmented by the fluid pressure in said chamber when said valve member is in the outlet port blocking position.

5. A centrifugal control mechanism comprising rotatable housing structure defining a chamber, means for admitting a pressurized fluid to said chamber, a radially outwardly facing outlet port communicating with said chamber, a movable spherical valve member disposed within said chamber in cooperative relation with said outlet port and movable in radially outward direction by centrifugal force to unblock said outlet port, means for biasing said valve member in radially inwardly direction into blocking relation with said outlet port, and guiding means for maintaining said valve member in alignment with said outlet port during movement thereof, said valve member being of smaller cross-sectional area than said chamber and being additionally urged in radially inward direction when in the port blocking position by the fluid pressure in said chamber.

6. A centrifugal control mechanism comprising rotatable housing structure defining a chamber extending radially outwardly from the axis of rotation of said structure, means providing pressurized fluid, said housing having a continuously open inlet for admitting said fluid to said chamber, said housing having a radially inward portion, a radially outwardly facing outlet port provided in said portion and communicating with said chamber, a movable valve member of smaller cross-sectional area than said chamber and disposed therein, means for maintaining said valve member in alignment with said outlet port, said valve member being radially outwardly movable by centrifugal force, spring means for biasing said valve member in radially inwardly direction against said centrifugal force into blocking relation with said outlet port, said valve member being urged in radially inward direction when in the outlet port blocking position by the additional force of fluid pressure in said chamber, a fluid actuated servo-motor, means defining a fluid conduit connecting said outlet port to said servo-motor, and means defining a continuously open restricted drain opening communicating with said conduit, said valve member being movable into and out of port blocking position with a snap-action.

References Cited in the file of this patent
UNITED STATES PATENTS

| | | |
|---|---|---|
| 2,311,209 | Carnagua | Feb. 16, 1943 |
| 2,401,883 | Pugh et al. | June 11, 1946 |
| 2,519,990 | Wolfe | Aug. 22, 1950 |
| 2,606,499 | Witherell | Aug. 12, 1952 |
| 2,876,784 | Adams | Mar. 10, 1959 |